Figure 1:
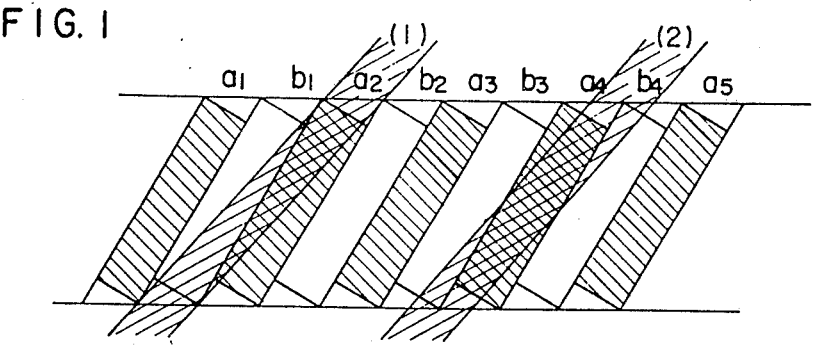

United States Patent [19]

Misaki et al.

[11] 4,280,146

[45] Jul. 21, 1981

[54] ROTARY HEAD TYPE MAGNETIC VIDEO RECORDING AND REPRODUCING APPARATUS

[75] Inventors: Takashi Misaki, Hirakata; Takanori Aoki, Higashiosaka; Yukihiko Miyawaki, Kadoma, all of Japan

[73] Assignee: Matsushita Electric Industrial Co., Ltd., Osaka, Japan

[21] Appl. No.: 967,357

[22] Filed: Dec. 7, 1978

[30] Foreign Application Priority Data

Dec. 13, 1977 [JP] Japan .................................. 52-150205

[51] Int. Cl.³ ...................... H04N 5/78; G11B 27/02; G11B 15/48
[52] U.S. Cl. ......................................... 360/10; 360/14; 360/74.1
[58] Field of Search ............................. 360/10, 14, 74

[56] References Cited

U.S. PATENT DOCUMENTS

| | | | |
|---|---|---|---|
| 3,789,138 | 1/1974 | Terada | 360/10 |
| 3,943,562 | 3/1976 | Opelt | 360/10 |
| 3,968,518 | 7/1976 | Kihara et al. | 360/10 |
| 4,101,936 | 7/1978 | Shinhara | 360/10 |

*Primary Examiner*—Cook Daryl W.
*Attorney, Agent, or Firm*—Stevens, Davis, Miller & Mosher

[57] ABSTRACT

A helical scanning rotary head type magnetic video recording and reproducing apparatus for recording and reproducing a video signal sequentially by a rotary head such that each field of the video signal follows a record locus which is oblique to the length of a magnetic tape is disclosed, in which when the apparatus is switched from a normal playback mode to a still image playback mode, a capstan is switched to a low speed drive mode and a lowest level point of an envelope of a reproduced output of the rotary head is detected and the capstan is stopped when the detected point lies at a rotary head switching point.

3 Claims, 8 Drawing Figures

ROTARY HEAD TYPE MAGNETIC VIDEO RECORDING AND REPRODUCING APPARATUS

The present invention relates to a helical scan type magnetic recording and reproducing apparatus (VTR) constructed to enable high quality playback of a still image with a simple construction.

As is well known, the helical scan type VTR records and reproduces each field or frame of video signal sequentially by a rotary head as a record locus which is oblique to the length of a magnetic tape, and it is constructed to record a vertical synchronizing signal at an end of each record locus such that a transition point from one record track to the next record track, that is, a switching point of the rotary head lies near the vertical synchronizing signal.

When such a helical scan type VTR is operated in a playback mode with the magnetic tape being stopped, a still image can be reproduced. However, since the scan locus of the rotary head on the magnetic tape when the magnetic tape is stopped does not coincide with the record locus, the rotary head cannot exactly scan the record locus and there exists a time period during which no playback signal is produced. If this zero-playback signal period lies near the vertical synchronizing signal, an image including a substantially small defect can be displayed on the television receiver.

Since the position of the zero-playback signal period on the display screen changes depending on positional relationship between the rotation locus of the rotary head and the record locus, that is, the stop position of the magnetic tape, or prior art apparatus has stopped the magnetic tape and then slightly moved the magnetic tape to an optimum image position while watching a reproduced image.

The present invention provides a magnetic video recording and reproducing apparatus which can automatically provide an optimum image in the still image playback mode.

Figure 2:
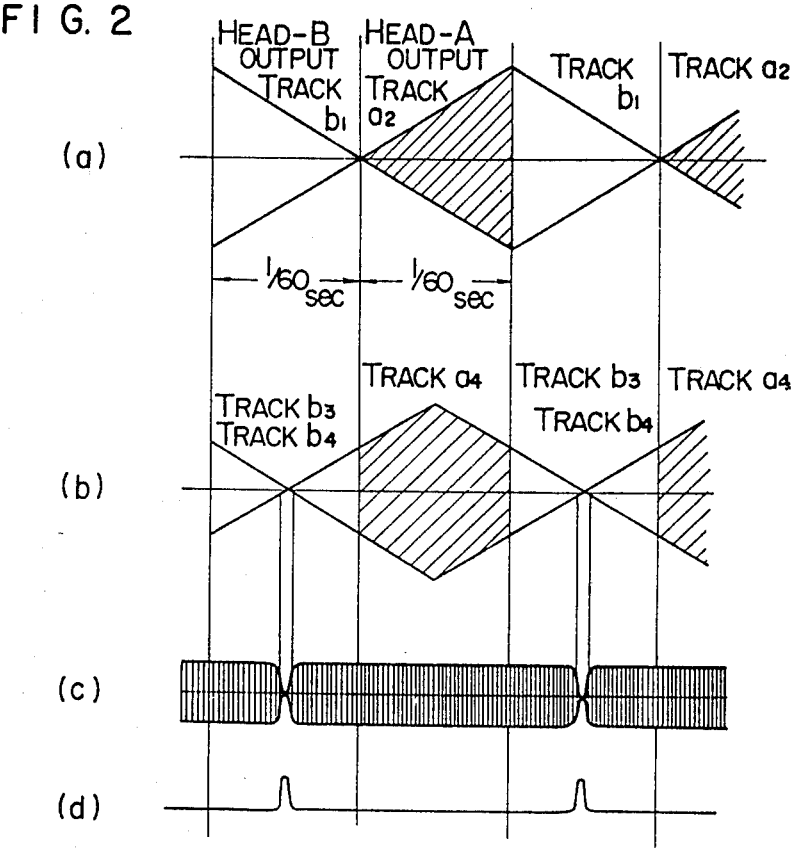
Figure 3:
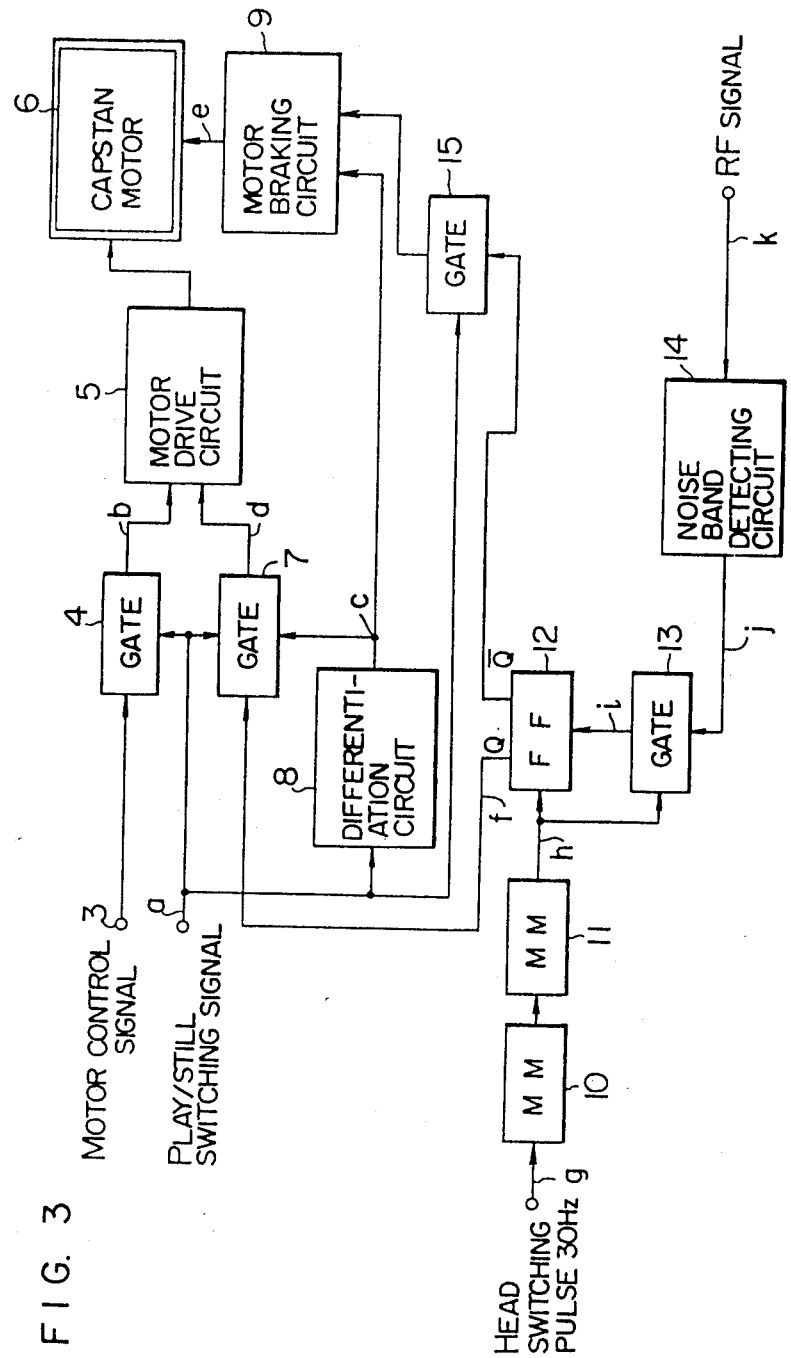
Figure 4:
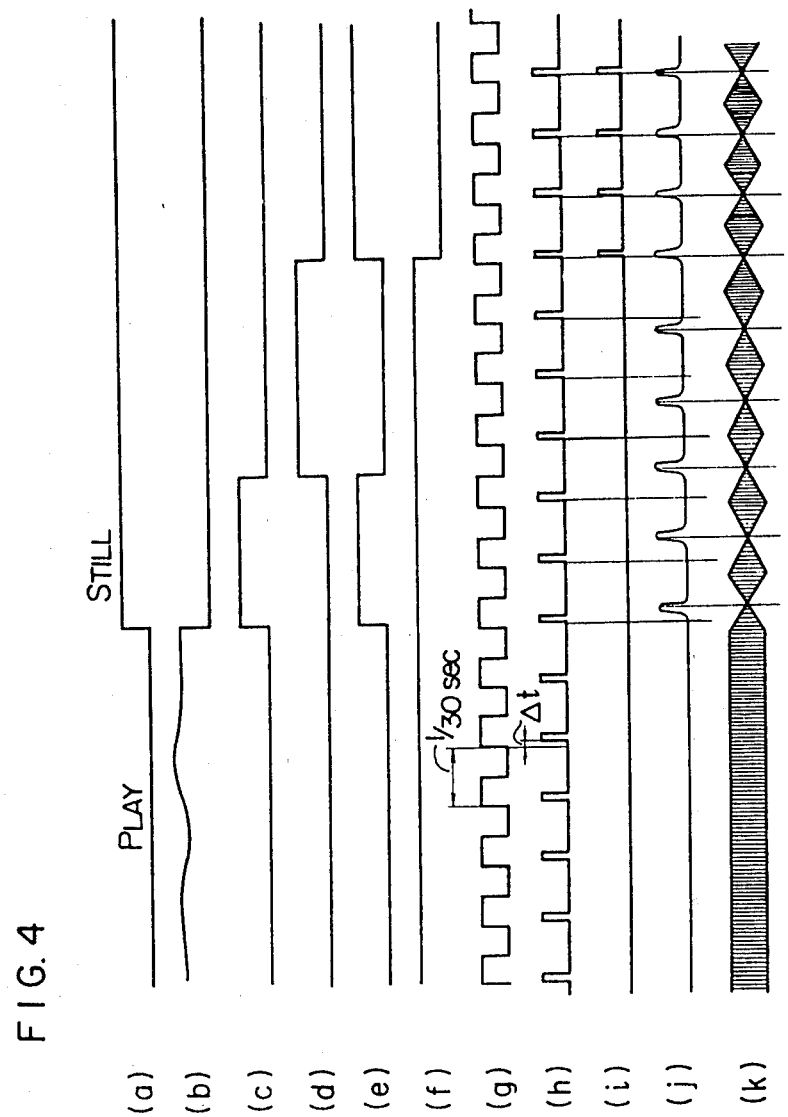
Figure 5:
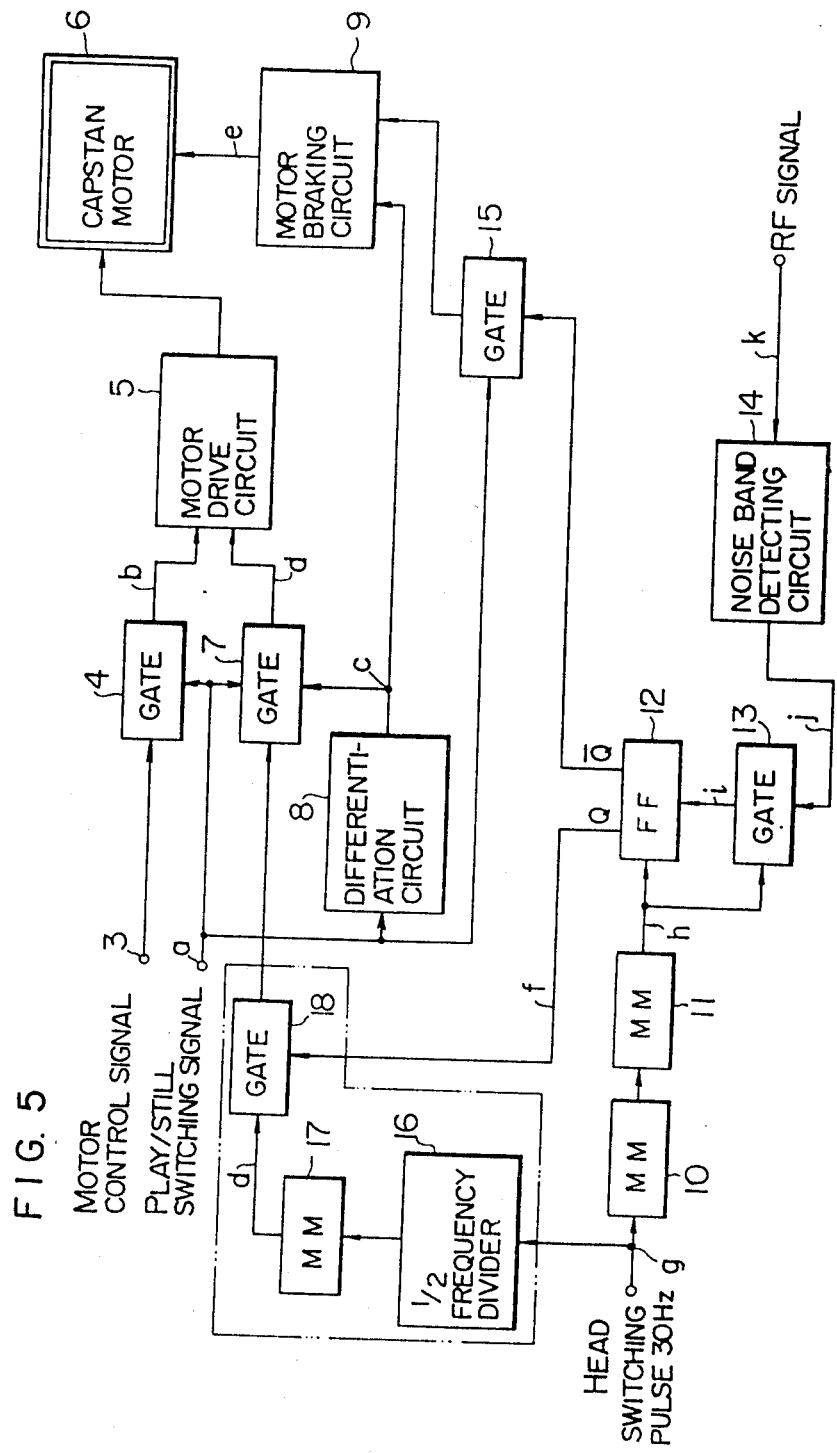
Figure 6:
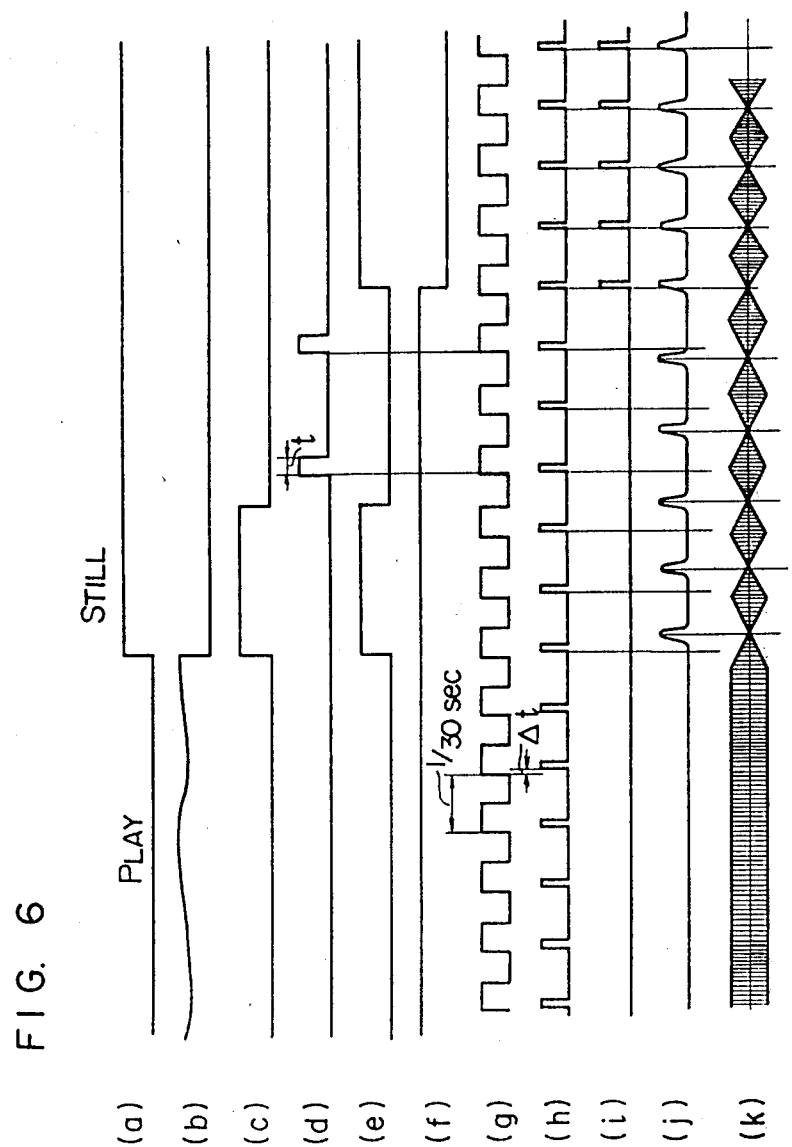
Figure 7:
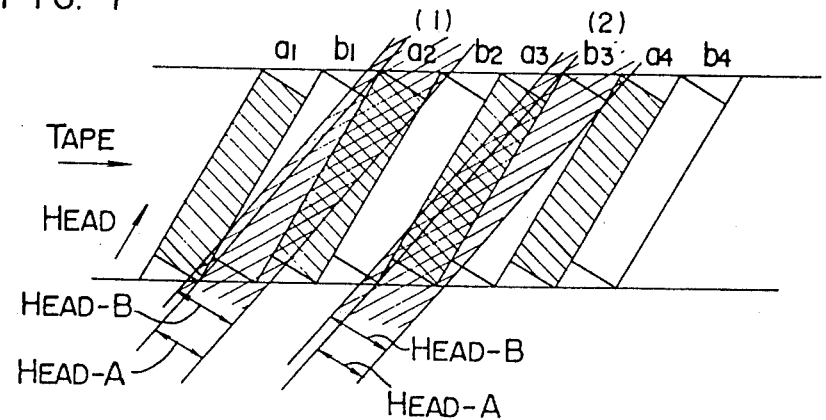
Figure 8:
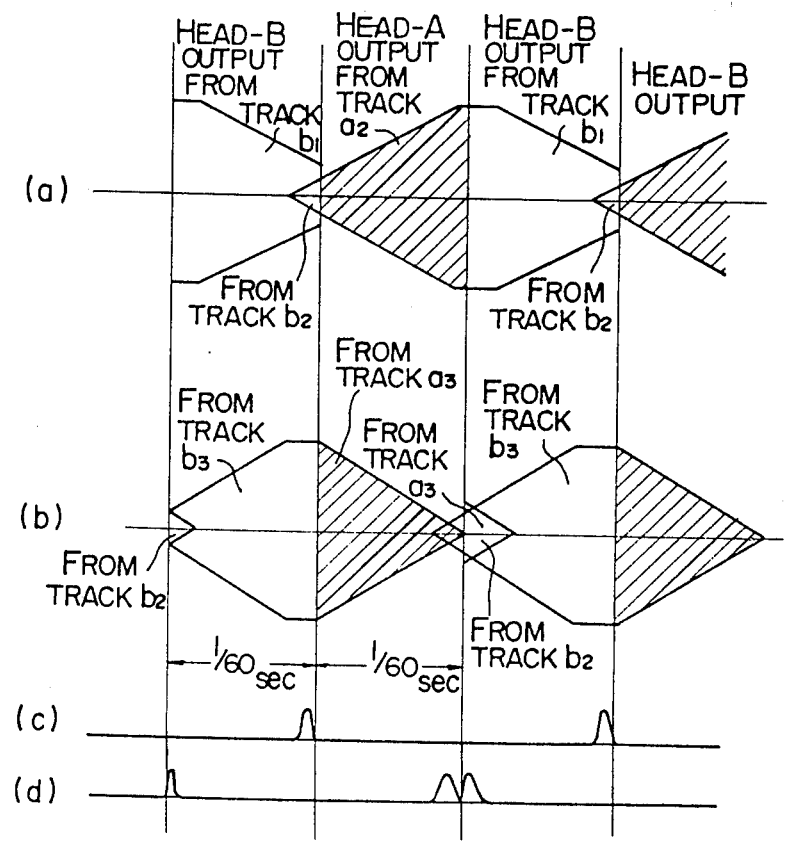

Preferred embodiments of the present invention will now be described in conjunction with the accompanying drawings, in which:

FIG. 1 shows a tape pattern and still image playback loci for an azimuth recording system;

FIG. 2, consisting of a-d, shows envelope waveforms and noise band waveforms for each of the playback loci shown in FIG. 1;

FIG. 3 is a block diagram illustrating one embodiment of the present invention;

FIG. 4, consisting of a-k, shows operational waveforms at various points in FIG. 3;

FIG. 5 is a block diagram illustrating another embodiment of the present invention;

FIG. 6, consisting of a-k, shows operational waveforms at various points in FIG. 5;

FIG. 7 shows a tape pattern for the azimuth recording system and still image playback loci for different track width of video heads; and FIG. 8, consisting of a-d, shows envelope waveforms and noise band waveforms for the loci of FIG. 7.

FIG. 1 shows a record locus of a two-head helical scan type VTR and a video head locus in the still image playback mode. Head gap angles of the two video heads A and B slightly differ from each other to carry out azimuth recording. Accordingly, the tracks $a_1, a_2, a_3 \ldots$ recorded by the head A can only be reproduced by the head A while the tracks $b_1, b_2, b_3, \ldots$ recorded by the head B can only be reproduced by the head B. FIG. 2 shows the envelopes of head outputs (frequency modulated video signals) in the still image playback mode, in which (a) and (b) correspond to the still image playback loci 1 and 2 in FIG. 1, respectively. For the locus 1, the zero-envelope period is at the head switching point and it is within a vertical blanking period. For the locus 2, the zero-envelope period lies in an image field. As the envelope output approaches zero, the reproduced image falls within a noise band. FIG. 2 (c) shows a waveform of a limiter which receives the head output (b) in FIG. 2. FIG. 2 (d) shows an amplitudedetected waveform of the waveform (c). In the present invention, the waveform (d) is sensed to determine which track the head is now scanning. That is, the tape is moved until the pulse in the detected output (d) which is produced in a small-envelope output period occurs near the head switching point.

FIG. 3 shows a specific configuration of one embodiment of the present invention, and FIG. 4 shows waveforms thereof.

When the VTR is in a normal playback mode, a motor control signal is applied to an input terminal 3 and gated by a gate 4 to a motor drive circuit 5 which drives a capstan motor 6 at a predetermined speed. When a PLAY/STILL switching signal a for the normal playback mode and a still image playback mode is turned to the STILL mode, the gate 4 is blocked and a gate 7 is activated. As a result, an output signal d from the gate 7 is supplied to the motor drive circuit 5 to drive the capstan motor 6. At the instant of switching of the switching signal a to the STILL mode, a differentiation circuit 8 operates to produce an output signal C. During a high level period of the signal C, the gate 7 is momentarily blocked in spite of the switching signal a to activate a motor braking circuit 9 to apply electromagnetic brake to the capstan motor 6 to stop a tape. Thereafter, the capstan 6 is driven by the control signal d from the gate 7. A head switching pulse g (at 30 Hz for NTSC system) for switching a head A and a head B in accordance with rotational phase of the rotary head is phase-shifted by $\Delta t$ by a monostable multivibrator (MM) 10 and reshaped to a narrow pulse h by a monostable multivibrator (MM) 11. The pulse h is used as a set signal for a flip-flop (FF) 12 and a gate signal for a gate 13. An RF signal k from the head is detected by a detecting circuit 14 which produces a pulse j (corresponding to (d) in FIG. 2) for detecting a zero-envelope output period. The pulse j is used to determine which track the head is scanning. That is, the pulse j is applied to the gate 13 which receives the gate pulse h. Thus, only when the pulse j is in phase with the gate pulse h, the gate 13 produces a signal i which is used as a reset signal for the FF 12. The FF 12 produces a high level signal f at a Q-terminal thereof when the set signal h is present and the reset signal i is absent. On the other hand, when the reset signal i is present, the Q-terminal produces a low level signal and a $\overline{Q}$-terminal produces a high level signal, which is applied to the motor braking circuit 9 through a gate 15. The gate 15 is turned on and off under the control of the switching signal a so that it is activated only during the STILL mode. That is, when the switching signal a is switched to the STILL mode, the capstan motor 6 is momentarily applied with the electromagnetic brake by the output c from the differentiation circuit 8 so that the motor is momentarily stopped. Thereafter, the motor is driven by the output signal f of the FF 12. The signal level of the signal f is preset to slowly drive the motor. Thus, the tape is slowly driven, and when the signal j from the noise band detecting circuit 14 approaches a head switching pulse switching point and becomes in phase with the pulse h, the FF 12 is reset and the signal f is switched to the low level to block the control signal to the motor. At the same time, the $\overline{Q}$-terminal of the FF 12 produces the motor braking signal to momentarily stop the tape. As a result, the position of the noise band is kept in a vertical blanking period. Thus, according to the present invention, when the apparatus is switched from the PLAY mode to the STILL mode, the tape is always stopped at a position which assures that the noise band is in the vertical blanking period. Accordingly, a still image free from noise band can be attained. While the electromagnetic brake of the motor is used to stop the tape in the illustrated embodiment, a mechanical brake of a reel system may be used. In this case, a solenoid may be controlled in a similar way.

In an actual design, it is advisable to make a track width of the head slightly wider than a pitch of a record pattern in order to reduce the noise band width as much as possible.

While the noise band gate signal h is at 30 Hz or it appears for each frame in the illustrated embodiment, it may be at 60 Hz or appear for each field.

Another embodiment of the present invention is now explained. FIG. 5 shows a configuration and FIG. 6 shows waveforms thereof. The present embodiment is characterized in that the capstan motor is driven by a pulse signal in order to more accurately stop the tape at the time of switching to the STILL mode to further improve the quality of the still image. FIG. 5 is substantially same as FIG. 3 except that blocks encircled by dotted lines are added for the pulse drive. Only those blocks are explained here. The 30 Hz head switching pulse g is frequency-divided by a $\frac{1}{2}$ frequency divider 16 which produces a 15 Hz pulse, which is applied to a monostable multivibrator (MM) 17 to produce a motor control signal d of a pulse width Z and a frequency of 15 Hz. The pulse width Z is determined depending on the speed of tape feed and the accuracy thereof. The motor control signal d is applied to a gate 18 which is controlled by the output f of the FF 12, and the output from the gate 18 is applied to the gate 7. Since the pulse drive assures accurate and fine feed of the tape, it is most suitable for the control of this type.

While the azimuth recording in which the head gap angles slightly differ from each other has been explained above, a convertional recording, other than azimuth recording, which has been previously adopted may be handled in a similar way.

Another embodiment of the present invention which further improves the quality of a still image is now explained.

In order to improve the quality of the still image the noise band width (low level period of the reproduced envelope) should be as narrow as possible. It has been stated that it is advisable to make the track width of the playback head slightly wider than the record track width. In this case, if the widths of the heads A and b slightly differ from each other, the noise band width can be further reduced when the noise band is captured in the vertical blanking period. In one example, for the track width of 58 $\mu$m, a satisfactory result is obtained when the width of the head A is 90 $\mu$m and the width of the head B is 70 $\mu$m. FIG. 7 shows STILL loci when those heads are used. Loci 1 and 2 show that there are two different loci for on-track. FIG. 8 shows envelope outputs. In FIG. 8, (a) shows a reproduced envelope output for the locus 1 and (b) shows that for the locus 2, and (c) and (d) show the occurence of noise. The noise in this case is mainly due to a beat caused by simultaneous reproduction of in-phase tracks (tracks $b_1$ and $b_2$, $b_2$ and $b_3$ or $a_3$ and $a_4$).

It is seen from the noise signals (c) and (d) that the locus 1 has smaller magnitude of noise band. That is, in case of the locus 1, the period in which the inphase tracks are simultaneously reproduced occurs only at the head B at the time of switching from the head B to the head A, and in case of the locus 2, it occurs at both the head B and the head A.

As a result, the apparatus should be designed such that it is stopped on the locus 1. To this end, the gate signal h in FIGS. 4 and 6 is produced such that it gates only during the period of the locus 1.

That is, the gate signal h which lies at the output of the head B at the time of switching from the head B to the head A may be used to operate the gates.

As described hereinabove, according to the present invention, the magnetic tape is automatically stopped at the position which assures the optimum still image reproduction so that a high quality of still image is always reproduced.

What is claimed is:

1. A rotary head type magnetic video recording and reproducing apparatus for recording and reproducing a video signal sequentially on a magnetic tape driven by a capstan by alternately using two rotary heads switched in response to a pulsed switching signal, such that each field of a frequency modulated video signal follows a record locus which is oblique to the length of the magnetic tape, characterized in that said apparatus comprises:

a capstan motor for driving the capstan;

gate means for providing a first motor driving signal corresponding to a first tape speed at a time of normal recording and reproduction and a second motor driving signal corresponding to a second tape speed which is slower than said first tape speed, said gate means selectively supplying said first motor driving signal to said capstan motor at the time of the normal recording and reproduction and for selectively supplying said second motor driving signal at the time of reproducing still pictures;

means for generating an envelope pulse signal at the time the envelope level of the reproduced video signal of said rotary head is a minimum;

means for comparing the phase of said switching signal corresponding to two rotary head switching points with the phase of said envelope pulse signal and for generating an output pulse signal when the phases of said signals are substantially the same;

a flip-flop connected to receive said switching signal as a set signal and connected to receive said output pulse signal as a reset signal, said flip-flop providing an enabling voltage to said gating means when a set signal is received; and a motor braking means for braking said capstan motor in response to the reset of said flip-flop, whereby said motor is enabled when said flip-flop is set and said braking means is activated when said flip-flop is reset.

2. A rotary head type magnetic video recording and reproducing apparatus according to claim 1, characterized in that said second motor driving signal comprises a pulse signal.

3. A rotary head type magnetic video recording and reproducing apparatus according to claim 4 characterized in that the rotary head comprises two head elements having different head gap angles and different head widths and the capstan is stopped when the lowest level point of the envelope of the reproduced output of a predetermined one of said head elements lies at the end of the head switching point.

* * * * *